US011285893B2

(12) United States Patent
Goto

(10) Patent No.: US 11,285,893 B2
(45) Date of Patent: Mar. 29, 2022

(54) ELECTRIC WIRE

(71) Applicant: Yazaki Corporation, Tokyo (JP)

(72) Inventor: Hiroki Goto, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/130,204

(22) Filed: Dec. 22, 2020

(65) Prior Publication Data

US 2021/0197741 A1 Jul. 1, 2021

(30) Foreign Application Priority Data

Dec. 27, 2019 (JP) .............................. JP2019-238496

(51) Int. Cl.
*B60R 16/02* (2006.01)
*H01B 7/22* (2006.01)

(52) U.S. Cl.
CPC ........... *B60R 16/0215* (2013.01); *H01B 7/22* (2013.01)

(58) Field of Classification Search
CPC ................................................. B60R 16/0215
See application file for complete search history.

(56) References Cited

U.S. PATENT DOCUMENTS

| | | | |
|---|---|---|---|
| 3,463,674 A | * 8/1969 | Black | H01B 13/0006 136/233 |
| 6,308,732 B1 | * 10/2001 | Herndon | H01R 13/5205 123/509 |
| 6,353,177 B1 | 3/2002 | Young | |
| 9,859,805 B2 | * 1/2018 | Thibaut | H02J 4/00 |
| 2010/0263926 A1 | * 10/2010 | Murayama | B60R 16/0207 174/71 R |
| 2013/0140054 A1 | * 6/2013 | Kato | H02G 1/00 174/68.3 |
| 2013/0248038 A1 | * 9/2013 | Aoyama | B60R 16/0215 138/103 |
| 2016/0133356 A1 | 5/2016 | Kondo | |
| 2017/0326479 A1 | * 11/2017 | Lu | B01D 29/15 |
| 2018/0114606 A1 | 4/2018 | Ikeya | |
| 2020/0251250 A1 | * 8/2020 | Lyfar | H01B 7/1805 |

FOREIGN PATENT DOCUMENTS

| | | |
|---|---|---|
| JP | 2012-045962 A | 3/2012 |
| JP | 2015-095280 A | 5/2015 |
| JP | 2015-201285 A | 11/2015 |
| WO | 2018088419 A1 | 5/2018 |

* cited by examiner

*Primary Examiner* — Paresh Paghadal
(74) *Attorney, Agent, or Firm* — Sughrue Mion, PLLC

(57) ABSTRACT

An electric wire includes a core wire made of a conductive metal, and an insulating covering that covers an outer circumference of the core wire. A part of at least one of the core wire and the insulating covering is formed with a flat part flatter than a rest of the at least one of the core wire and the insulating covering.

4 Claims, 3 Drawing Sheets

ELECTRIC WIRE

CROSS-REFERENCE TO RELATED APPLICATION

The present application is based on, and claims priority from Japanese Patent Application No. 2019-238496, filed on Dec. 27, 2019, the entire contents of which are incorporated herein by reference.

TECHNICAL FIELD

The disclosure relates to an electric wire such as a thick high-voltage electric wire.

BACKGROUND

In a vehicle such as an electric vehicle and a hybrid vehicle, a high-voltage wire harness is used for an electrical connection between electric components. As an electric component, there is a battery, an inverter, a motor or the like.

In general, there is used an electric wire including an electric conductor (core wire) having a circular cross-section as a wire harness. In this case, it may be difficult to arrange a high-voltage wire harness in a narrow portion included in a routing path because the high-voltage wire harness is thick.

In order to address this problem, JP 2015-95280 discloses a covered electric wire created by covering with a covering member, a flat part where an electric conductor (core wire) made of a conductive metal is flattened. By using this covered electric wire as a high-voltage wire harness, the high-voltage wire harness can be arranged in the narrow portion included in the routing path.

SUMMARY

However, in the covered electric wire disclosed in JP 2015-95280, after an insulating covering at a predetermined position is removed and then the electric conductor at the predetermined position is flattened, the flat part must be covered with a covering member to maintain the flattened shape of the electric conductor. This makes the processing complicated and the structure complex, which makes it costly.

The disclosure has been made in view of such a conventional problem, and it is an object of the disclosure to provide an electric wire being simple in structure and being reduced in height and cost more effectively.

According to an embodiment, there is provided an electric wire including a core wire made of a conductive metal; and an insulating covering that covers an outer circumference of the core wire, wherein a part of at least one of the core wire and the insulating covering is formed with a flat part flatter than a rest of the at least one of the core wire and the insulating covering.

It is preferred that the core wire includes a plurality of strands each having a circular cross-section and a small diameter, and a part of each strand is flattened and has an elliptical cross-section.

It is preferred that the core wire includes one rod-shaped conductor having a circular cross-section and a large diameter, and a part of the rod-shaped conductor is flattened and has an elliptical cross-section.

It is preferred that a part of the insulating covering is formed with a flat part flatter than a rest of the insulating covering.

It is preferred that a part of the core wire and a part of the insulating covering that covers the part of the core wire, are formed with flat parts flatter than a rest of the core wire and a rest of the insulating covering.

It is preferred that the core wire includes a plurality of strands each having a circular cross-section and a small diameter, a part of the core wire is formed with a flat part flatter than a rest of the core wire in a state where the circular cross-section of each strand is maintained, and a part of the insulating covering that covers the part of the core wire, is formed with a flat part flatter than a rest of the insulating covering.

According to the embodiment, it is possible to provide an electric wire being simple in structure and being reduced in height and cost more effectively.

DETAILED DESCRIPTION

High-voltage electric wires according to exemplary embodiments will be described in detail below with reference to drawings.

First Exemplary Embodiment

Figure 1:
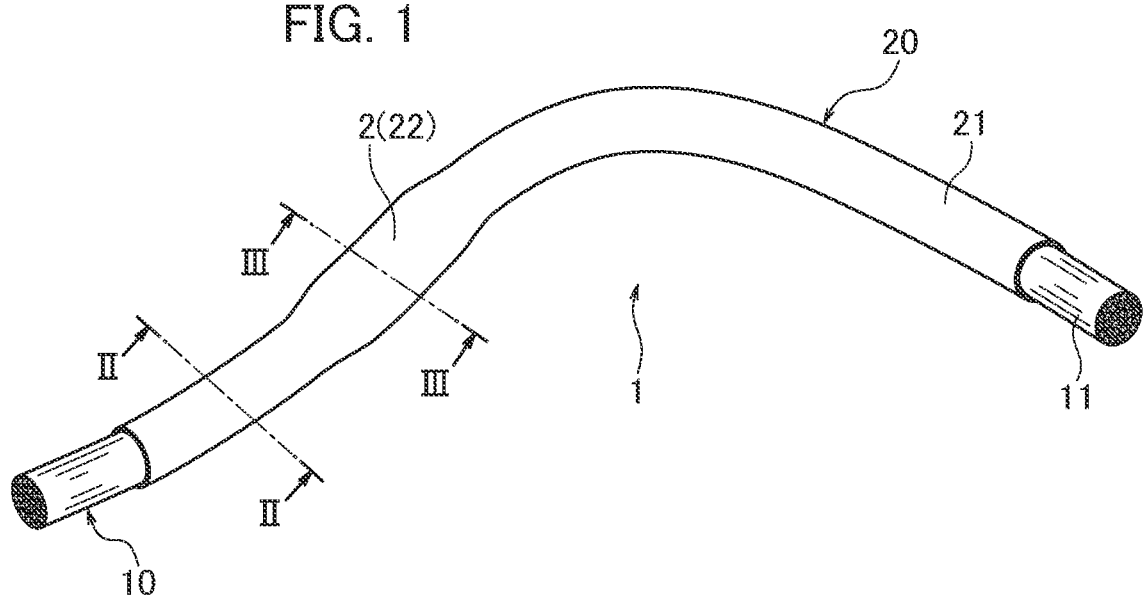
FIG. 1 is a perspective view of a high-voltage electric wire according to a first exemplary embodiment of the disclosure.

As illustrated in FIG. 1, a high-voltage electric wire (electric wire) 1 is a thick electric wire capable of carrying a large amount of current, and includes a core wire 10 and an insulating covering 20. The core wire 10 is made of a conductive metal. The insulating covering 20 covers an outer circumference of the core wire 10. A part of the high-voltage electric wire 1 in a longitudinal direction of the high-voltage electric wire 1, is formed with a flat part 2 flatter than the rest of the high-voltage electric wire 1. In the flat part 2, the core wire 10 and the insulating covering 20 are flattened.

Figure 2:
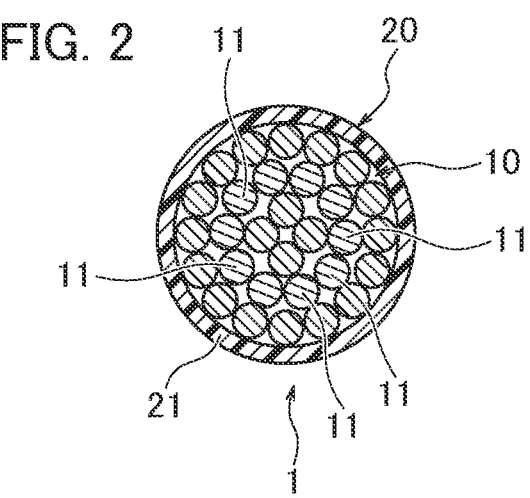
FIG. 2 is a cross-sectional view taken along a line II-II of FIG. 1.

As illustrated in FIG. 2, the high-voltage electric wire 1 has a circular cross-section, except in the flat part 2. A part of the core wire 10 in a longitudinal direction of the core wire 10, is formed with a flat part 12 flatter than the rest of the core wire 10 (see FIG. 3). More specifically, in the flat part 2 of the high-voltage electric wire 1, the core wire 10 is formed with the flat part 12. The core wire 10 has a circular cross-section, except in the flat part 12. The core wire 10 includes a plurality of strands 11 each having a small diameter. Each strand 11 has a circular cross-section, except in the flat part 12.

Figure 3:
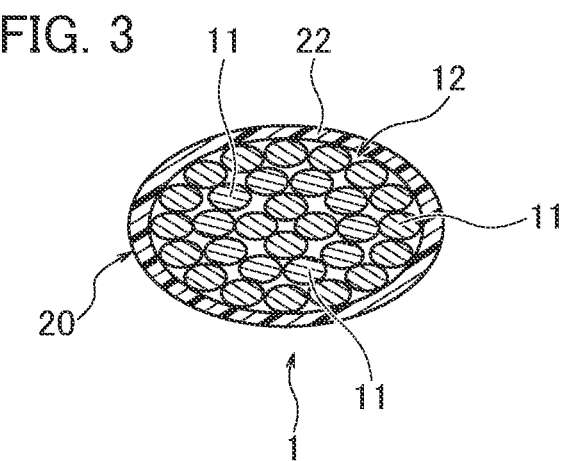
FIG. 3 is a cross-sectional view taken along a line of FIG. 1.

As illustrated in FIG. 3, the high-voltage electric wire 1 has an elliptical cross-section in the flat part 2. The core wire 10 has an elliptical cross-section in the flat part 12. Each strand 11 has an elliptical cross-section in the flat part 12.

Each strand 11 is made of aluminum, copper or copper alloy. In the flat part 12, the core wire 10 is flattened in a state where each strand 11 is flattened without compressive deformation (without changing a cross-sectional area of each strand 11). In a process for flattening each strand 11, a pressure is applied to the high-voltage electric wire 1 using a press, a roller or the like to flatten each strand 11 without compressive deformation (without changing a cross-sectional area of each strand 11). This ensures that a value of a current to be energized is not affected.

The insulating covering 20 is made of a thermoplastic synthetic resin. A part of the insulating covering 20 in a longitudinal direction of the insulating covering 20, is formed with a flat part 22 flatter than the rest of the insulating covering 20. More specifically, in the flat part 2 of the high-voltage electric wire 1, the insulating covering 20 is formed with the flat part 22. The insulating covering 20 in the flat part 22 covers (faces) the core wire 10 in the flat part 12.

As illustrated in FIG. 2, the insulating covering 20 has a circular cross-section, except in the flat part 22. As illustrated in FIG. 3, the insulating covering 20 has an elliptical cross-section in the flat part 22.

After the flat part 12 is formed in the core wire 10 while flattening the strands 11 without compressive deformation, the flat part 22 is formed by applying heat to a circumference 21 of the insulating covering 20, pressing the circumference 21 of the insulating covering 20, and cooling the circumference 21 of the insulating covering 20. Thus, the part of core wire 10 and the part of the insulating covering 20 are respectively formed with the flat parts 12, 22 flatter than the rest of the core wire 10 and the rest of the insulating covering 20. By the flat parts 12, 22, the part of the high-voltage electric wire 1 is formed with the flat part 2 flatter than the rest of the high-voltage electric wire 1.

According to the first exemplary embodiment, the part of the high-voltage electric wire 1 in the longitudinal direction of the high-voltage electric wire 1, is easily formed with the flat part 2 flatter than the rest of the high-voltage electric wire 1, by only forming the flat part 12 on the part of the core wire 10 in the longitudinal direction of the core wire 10 and forming the flat part 22 on the part of the insulating covering 20 in the longitudinal direction of the insulating covering 20. Since the structure is so simple that the flat parts 12, 22 are formed by only pressing the part of the core wire 10 in the longitudinal direction of the core wire 10 and the part of the insulating covering 20 in the longitudinal direction of the insulating covering 20, it is possible to reduce the height and the cost of the high-voltage electric wire 1 more effectively.

The flat part 2 makes it possible to reduce the height of the part of the high-voltage electric wire 1 in the longitudinal direction of the high-voltage electric wire 1. This enables an arrangement of the high-voltage electric wire 1 in a routing path under a floor of a vehicle such as an electric vehicle or a hybrid vehicle even when a narrow portion (narrow space) is included in the routing path. This makes it possible to use the high-voltage electric wire 1 for an electrical connection between electric components such as batteries, inverters, and motors in the electric vehicle or the hybrid vehicle.

Second Exemplary Embodiment

Figure 4:
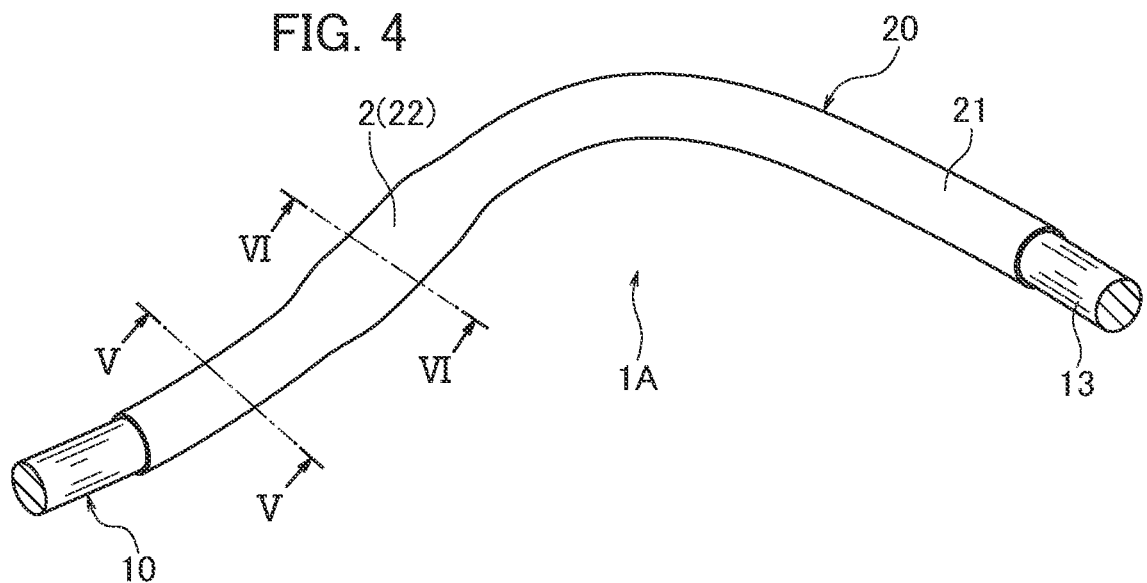
FIG. 4 is a perspective view of a high-voltage electric wire according to a second exemplary embodiment of the disclosure.

As illustrated in FIG. 4, a high-voltage electric wire 1A according to the second exemplary embodiment is different from the high-voltage electric wire 1 according to the first exemplary embodiment in that the core wire 10 includes one rod-shaped conductor 13 having a large diameter. Since other configurations are the same as the first exemplary embodiment described above, detailed explanations of the same configuration will be omitted with the same number for the same configuration.

Figure 5:
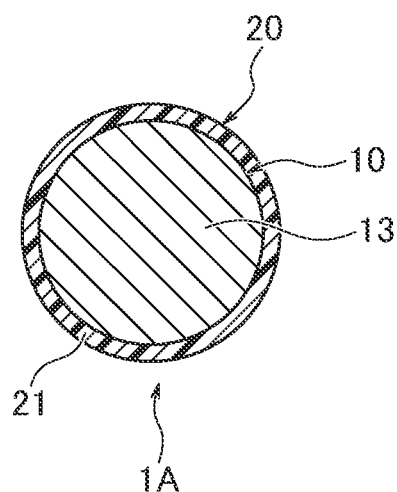
FIG. 5 is a cross-sectional view taken along a line V-V of FIG. 4.
Figure 6:
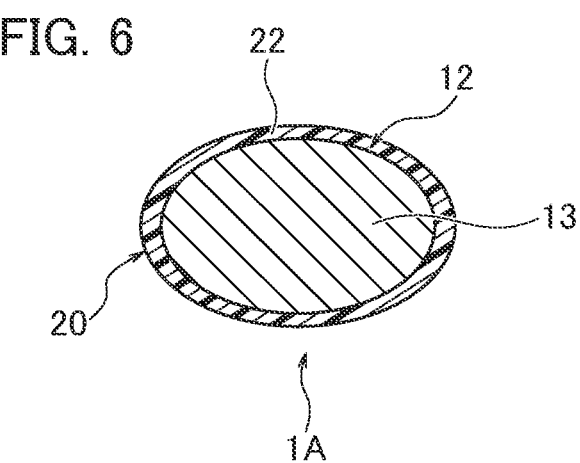
FIG. 6 is a cross-sectional view taken along a line VI-VI of FIG. 4.

As illustrated in FIG. 5, the rod-shaped conductor 13 has a circular cross-section, except in the flat part 12. As illustrated in FIG. 6, the rod-shaped conductor 13 has an elliptical cross-section in the flat part 12. In the flat part 12, the core wire 10 is flattened in a state where the rod-shaped conductor 13 is flattened without compressive deformation (without changing a cross-sectional area of the rod-shaped conductor 13). In a process for flattening the rod-shaped conductor 13, a pressure is applied to the high-voltage electric wire 1 using a press, a roller or the like to flatten the rod-shaped conductor 13 without compressive deformation (without changing a cross-sectional area of the rod-shaped conductor 13).

The high-voltage electric wire 1A has the same action and effect as the first exemplary embodiment by forming the flat parts 12, 22 in the part of the core wire 10 and the part of the insulating covering 20, respectively.

Third Exemplary Embodiment

Figure 7:
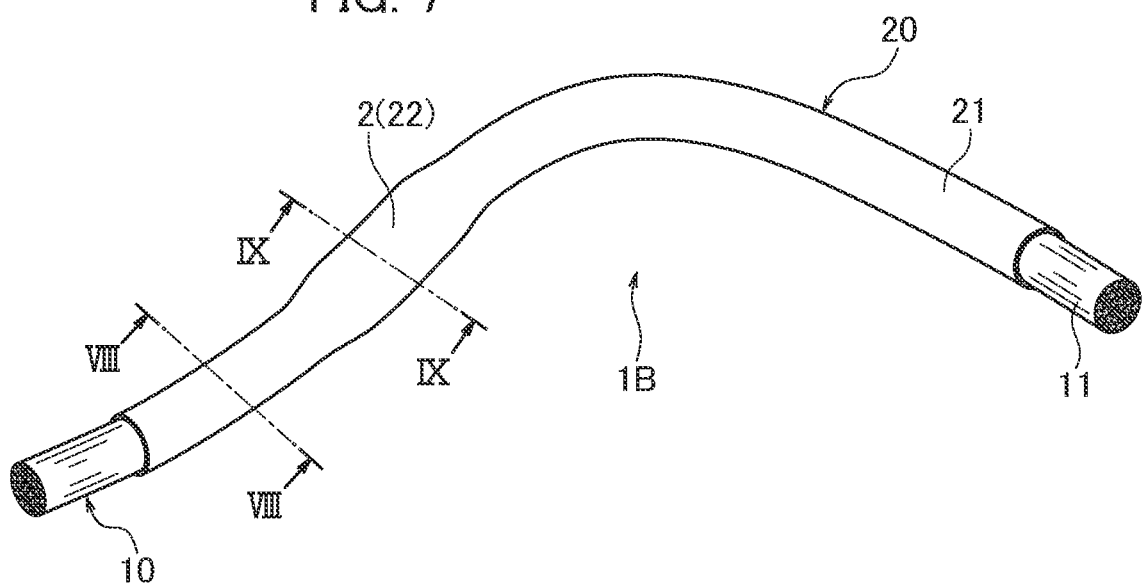
FIG. 7 is a perspective view of a high-voltage electric wire according to a third exemplary embodiment of the disclosure.

As illustrated in FIG. 7, a high-voltage electric wire 1B according to the third exemplary embodiment is different from the high-voltage electric wire 1 according to the first exemplary embodiment in that each strand 11 has a circular cross-section in the flat part 12. Since other configurations are the same as the first exemplary embodiment described above, detailed explanations of the same configuration will be omitted with the same number for the same configuration.

Figure 8:
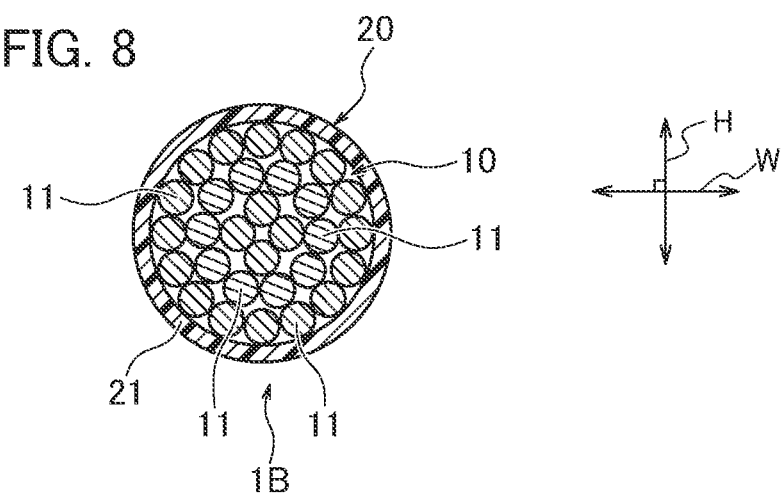
FIG. 8 is a cross-sectional view taken along a line VIII-VIII of FIG. 7.
Figure 9:
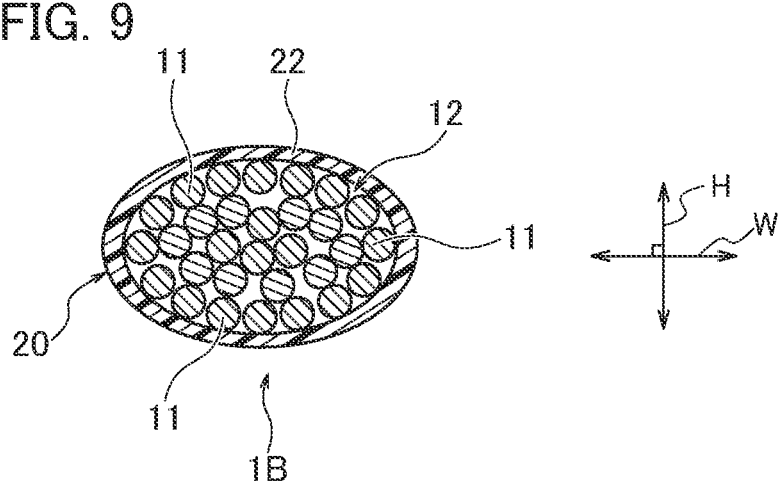
FIG. 9 is a cross-sectional view taken along a line IX-IX of FIG. 7.

As illustrated in FIG. 8, each strand 11 has a circular cross-section, in a part other than the flat part 12. As illustrated in FIG. 9, each strand 11 also has a circular cross-section in the flat part 12. In the flat part 12, the core wire 10 is flattened to spread out on both sides thereof in a state where the circular cross-section of each strand 11 is maintained without compressive deformation (without changing a cross-sectional area of each strand 11).

In a vicinity of a center of the core wire 10 in a width direction W of the high-voltage electric wire 1B, the number of strands 11 in a height direction H of the high-voltage electric wire 1B in the flat part 12 is smaller than the number of strands 11 in the height direction H of the high-voltage electric wire 1B in the part other than the flat part 12. In a vicinity of a center of the core wire 10 in the height direction H of the high-voltage electric wire 1B, the number of strands 11 in the width direction W of the high-voltage electric wire 1B in the flat part 12 is larger than the number of strands 11 in the width direction W of the high-voltage electric wire 1B in the part other than the flat part 12.

The high-voltage electric wire 1B has the same action and effect as the first exemplary embodiment by forming the flat parts 12, 22 in the part of the core wire 10 and the part of the insulating covering 20, respectively.

Other Exemplary Embodiments

Although the first to third exemplary embodiments have been described above, the disclosure is not limited to these. Various modifications can be made within the scope of the gist of the disclosure.

In the first to third exemplary embodiments, a part (one position) of each of the high-voltage electric wires 1, 1A and 1B in the longitudinal direction of each of the high-voltage electric wires 1, 1A and 1B, is formed with the flat part 2 flatter than the rest of each of the high-voltage electric wire 1, 1A and 1B. However, some parts (plural positions) of each of the high-voltage electric wires 1, 1A and 1B in the longitudinal direction of each of the high-voltage electric wires 1, 1A and 1B, may be formed with flat parts flatter than the rest of each of the high-voltage electric wires 1, 1A and 1B.

In the first to third exemplary embodiments, the part of the core wire 10 and the part of the insulating covering 20 are respectively formed with the flat parts 12, 22 flatter than the rest of the core wire 10 and the rest of the insulating covering 20. However, a part of at least one of the core wire 10 and the insulating covering 20 may be formed with a flat part flatter than a rest of the at least one of the core wire 10 and the insulating covering 20. In case where only the part of the core wire 10 is formed with the flat part, the insulating covering 20 side should be marked with a maker that shows the flat part of the core wire 10.

In the first to third exemplary embodiments, a part of each of the high-voltage electric wires 1, 1A, and 1B in the longitudinal direction of each of the high-voltage electric wires 1, 1A and 1B, is formed with the flat part 2 flatter than the rest of each of the high-voltage electric wire 1, 1A and 1B. However, a part of a low-voltage electric wire in a longitudinal direction of the low-voltage electric wire, may be formed with a flat part flatter than the rest of the low-voltage electric wire. In this case, a voltage lower than a voltage to be applied to each of the high-voltage electric wires 1, 1A and 1B, is applied to the low-voltage electric wire.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric wire comprising:
a core wire made of a conductive metal and including a plurality of strands; and
an insulating covering that covers an outer circumference of the core wire,
wherein a part of at least the core wire is formed with a flat part that is flatter than a rest of the core wire, wherein a part of each of the plurality of strands in the flat part of the core wire is flattened such that each of the plurality of strands in the flattened part of the plurality of strands has a same cross-sectional area as the respective plurality of strands in the rest of the core wire.

2. The electric wire according to claim 1, wherein the flattened part of the plurality of strands is not compressively deformed with respect to the plurality of strands in the rest of the core wire.

3. The electric wire according to claim 1, wherein the insulating covering is formed on the flat part of the core wire.

4. The electric wire according to claim 1, wherein the insulating covering is also formed with a flat part, and the flat part of insulating covering covers the flat part of the core wire.

* * * * *